United States Patent
Chen et al.

(10) Patent No.: US 11,200,022 B2
(45) Date of Patent: Dec. 14, 2021

(54) METHOD AND APPARATUS OF PLAYING AUDIO DATA

(71) Applicant: TENCENT MUSIC ENTERTAINMENT TECHNOLOGY [SHENZHEN] CO., LTD., Guangdong (CN)

(72) Inventors: Zijiang Chen, Shenzhen (CN); Jiafei Luo, Shenzhen (CN)

(73) Assignee: TENCENT MUSIC ENTERTAINMENT TECHNOLOGY [SHENZHEN] CO., LTD., Guangdong (CN)

( * ) Notice: Subject to any disclaimer, the term of this patent is extended or adjusted under 35 U.S.C. 154(b) by 0 days.

(21) Appl. No.: 16/765,754

(22) PCT Filed: Nov. 23, 2018

(86) PCT No.: PCT/CN2018/117312
§ 371 (c)(1),
(2) Date: May 20, 2020

(87) PCT Pub. No.: WO2019/101185
PCT Pub. Date: May 31, 2019

(65) Prior Publication Data
US 2020/0285439 A1 Sep. 10, 2020

(30) Foreign Application Priority Data

Nov. 24, 2017 (CN) .......................... 201711194659.5

(51) Int. Cl.
*G06F 3/16* (2006.01)
*G06F 21/51* (2013.01)
*G06F 16/74* (2019.01)

(52) U.S. Cl.
CPC .............. *G06F 3/165* (2013.01); *G06F 3/162* (2013.01); *G06F 3/167* (2013.01); *G06F 16/74* (2019.01); *G06F 21/51* (2013.01)

(58) Field of Classification Search
None
See application file for complete search history.

(56) References Cited

U.S. PATENT DOCUMENTS

2002/0152278 A1* 10/2002 Pontenzone ........... H04H 20/46
709/217
2009/0304359 A1* 12/2009 Lemay ................. H04N 21/816
386/353

(Continued)

FOREIGN PATENT DOCUMENTS

CN          103226966 A    7/2013
CN          104053051 A    9/2014

(Continued)

OTHER PUBLICATIONS

CNIPA, "First office action of Chinese application No. 201711194659.5" dated Apr. 1, 2019, p. 15, Published in: CN.

(Continued)

*Primary Examiner* — Tuan S Nguyen
(74) *Attorney, Agent, or Firm* — Neugeboren O'Dowd PC (57) ABSTRACT

A method of playing audio data including: upon receiving a searching instruction of a target audio, displaying a video corresponding to an audio name of the target audio on a search result list; upon detection that the video corresponding to the audio name is being played, determining whether a background playing function is enabled; and when the background playing function is enabled, upon detection that an interface of playing the video is exited, making the video to continue being played in the background, that the video's picture is not displayed on a current screen. An apparatus of (Continued)

playing audio data and a computer-readable storage medium are further provided.

15 Claims, 4 Drawing Sheets

(56) References Cited

U.S. PATENT DOCUMENTS

| | | | |
|---|---|---|---|
| 2011/0209206 A1 | 8/2011 | Surpatanu et al. | |
| 2015/0213839 A1 | 7/2015 | Woodman et al. | |
| 2015/0242068 A1* | 8/2015 | Losey | G11B 27/36 715/716 |
| 2015/0254242 A1* | 9/2015 | Cirrincione | G06F 16/43 707/722 |
| 2015/0371680 A1 | 12/2015 | Park | |
| 2016/0018959 A1* | 1/2016 | Yamashita | H04N 21/4396 715/716 |
| 2017/0041680 A1 | 2/2017 | Lewis et al. | |
| 2017/0353705 A1* | 12/2017 | Rivera | G11B 27/102 |

FOREIGN PATENT DOCUMENTS

| | | |
|---|---|---|
| CN | 105940671 A | 9/2016 |
| CN | 105979379 A | 9/2016 |
| CN | 106792075 A | 5/2017 |
| CN | 106937167 A | 7/2017 |
| CN | 107229448 A | 10/2017 |
| CN | 107360458 A | 11/2017 |
| CN | 107908929 A | 4/2018 |
| JP | 2006033328 A | 2/2006 |
| JP | 2017508368 A | 3/2017 |
| WO | 2015116827 A | 8/2015 |
| WO | 2015134289 A1 | 9/2015 |

OTHER PUBLICATIONS

CNIPA, "Second office action of Chinese application No. 201711194659. 5", dated Dec. 13, 2019, p. 14, Published in: CN.

CNIPA, "Notification to grant patent right for invention of Chinese application No. 201711194659.5", dated Jun. 30, 2020, p. 3, Published in: CN.

Japan Patent Office, "Notice of Reasons for Refusal of Japanese application No. 2020-545846 dated Sep. 14, 2021", Sep. 14, 2021, p. 10, Published in: JP.

KIPO, "Preliminary Office Action of Korean application No. 10-2020-7017098 dated Aug. 18, 2021", Aug. 18, 2021, p. 9, Published in: KR.

* cited by examiner

METHOD AND APPARATUS OF PLAYING AUDIO DATA

This application is a national phase of PCT application PCT/CN2018/117312 filed on Nov. 23, 2018, which claims priority to Chinese Patent Application No. 201711194659.5, filed on Nov. 24, 2017 and entitled "Method and device of playing audio data", the entire contents of which are incorporated herein by reference.

TECHNICAL FIELD

The present disclosure relates to a method of playing audio data and an apparatus of playing audio data.

BACKGROUND

With the development of computer technology, there are more and more music applications. In order to improve the use frequency of the music applications, various manufacturers of music applications generally purchase the copyright of some audio data.

When the copyright of some audio data belongs to a music application A, and the user who has a music application B installed wants to listen to an audio data which belongs to the music application A, the unique method is to download the music application A. As a result, if several audio data that the user wants to listen to belong to different music applications, the user needs to install all these music applications, which wastes a lot of time.

SUMMARY

Various embodiments of the present disclosure provide a method of playing audio data, the method including:

upon receiving a searching instruction of a target audio, displaying a video corresponding to an audio name of the target audio on a search result list;

upon detection that the video corresponding to the audio name is being played, determining whether a background playing function is enabled; and when the background playing function is enabled, upon detection that an interface of playing the video is exited, making the video to continue being played in the background, that the video's picture is not be displayed on a current screen.

In some embodiments of the present disclosure, upon detection that the interface of playing the video is exited, making the video to continue being played in the background includes:

when the smart terminal enters a screen-locked state, making the video to continue being played in the background.

In some embodiments of the present disclosure, upon receipt of the searching instruction for the target audio, displaying the video corresponding to the audio name of the target audio on the search result list includes:

upon receiving the searching instruction of the target audio, when it is determined that an authorization of playing the video corresponding to the target audio exists, displaying the video corresponding to the audio name of the target audio on the search result list.

In some embodiments of the present disclosure, upon detection that the video corresponding to the audio name is being played, determining whether the background playing function is enabled includes:

upon detection of an adding-to-playlist instruction, adding the video to a playlist and displaying the audio name on the playlist, wherein the adding-to-playlist instruction is configured to add the video corresponding to the audio name to the playlist; and according to the playlist, upon detection that the video corresponding to the audio name is being played, determining whether the background playing function is enabled.

In some embodiments of the present disclosure, the method further includes:

when the background playing function is not enabled, upon detection that the interface of playing the video is exited, determining a next audio following the video on the playlist; and playing the next audio.

Various Embodiments of the present disclosure provide an apparatus of playing audio data, the apparatus including a processor and a memory, the memory is configured to store at least one instruction, wherein the at least instruction can be loaded and executed by the processor; the processor is configured to: upon receiving a searching instruction of a target audio, display a video corresponding to an audio name of the target audio on a search result list; upon detection that the video corresponding to the audio name is being played, determine whether a background playing function is enabled; and when the background playing function is enabled, upon detection that an interface of playing the video is exited, make the video to continue being played in the background, that the video's picture is not displayed on a current screen.

Various Embodiments of the present disclosure provide a computer-readable storage medium. The storage medium stores at least one instruction, when the at least one instruction is loaded and executed by a processor, the processor is configured to upon receiving a searching instruction of a target audio, display a video corresponding to an audio name of the target audio on a search result list; upon detection that the video corresponding to the audio name is being played, determine whether a background playing function is enabled; and when the background playing function is enabled, upon detection that an interface of playing the video is exited, make the video to continue being played in the background, that the video's picture is not displayed on a current screen.

BRIEF DESCRIPTION OF THE DRAWINGS

In order to describe the technical solutions in the embodiments of the present more clearly, the following briefly introduces the accompanying drawings required for describing the embodiments. Apparently, the accompanying drawings in the following description show merely some embodiments of the present disclosure, and a person of ordinary skill in the art may further derive other drawings from these accompanying drawings without creative efforts.

DETAILED DESCRIPTION

The present disclosure will be described in further detail with reference to the accompanying drawings, to present objects, technical solutions, and advantages of the present disclosure more clearly.

An embodiment of the present disclosure provides a method of playing audio data. An execution body of this method may be a mobile terminal. The mobile terminal may be a smart terminal, such as a smart phone and a tablet computer, and a music application is installed on the mobile terminal and may be configured to play audio data and an MV (music video). The music application has an authorization of playing the MV of audio data. A processor, a memory, a transceiver, a microphone and the like may be disposed in the mobile terminal. The processor may be configured to process an audio data playing process. The memory may be configured to store data required for and data generated in the audio data playing process. The transceiver may be configured to receive and transmit a message and the like. The microphone may be configured to play audio data. A screen and other input and output devices may further be disposed in the mobile terminal. The screen may be configured to display a video picture of the MV and the like. In the embodiment of the present disclosure, the solution is described in detail by taking the mobile phone as the mobile terminal. Other situations are similar to this and will not be elaborated in this embodiment.

Figure 1:
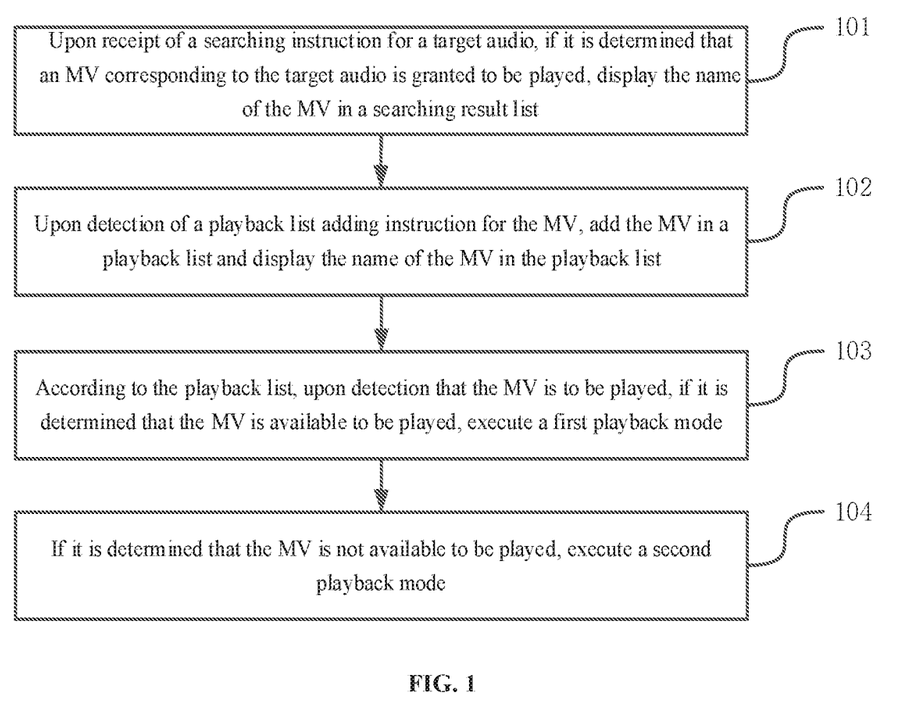
FIG. 1 is a flow chart of a method of playing audio data according to an embodiment of the present disclosure.

As illustrated in FIG. 1, the processing flow of the method of playing audio data may include the following steps.

In step 101, upon receiving a searching instruction for a target audio, if it is determined that an authorization of playing an MV corresponding to the target audio exists, a name of the MV is displayed on a search result list.

The target audio is any audio that a user wants to search for, and the embodiment of the present disclosure is described by taking the audio being a song as an example.

In implementation, when the user wants to listen to the target audio, the user may install a music application on the mobile terminal and then start the music application. The mobile terminal will display a main interface of the music application, on which a search box, an audio data list, an anchor station, a ranking list and other options are displayed. The user may input an audio name of the target audio in the search box, and then click on a corresponding searching button. The mobile terminal will detect a clicking instruction on the searching button, and then send, to a server, a searching request for the target audio, which carries the audio name of the target audio. Upon receiving the searching request, the server may parse the searching request to obtain the audio name of the target audio, and then search for the target audio according to the audio name of the target audio. If the target audio cannot be found (this is because the copyright of the target audio belongs to other music applications), the server may find whether a music video (MV, also referred to as a video) of the target audio exists. If the MV corresponding to the target audio exists, the server may send, to the mobile terminal, the name of the MV corresponding to the target audio, and an identifier indicating that the search result is the MV.

Upon receiving the name of the MV corresponding to the target audio and the identifier indicating that the search result is the MV, which are sent by the server, the mobile terminal may determine that there is only an authorization of playing the MV corresponding to the target audio, and display the MV corresponding to the target audio on the search result list. Here, the name of the MV corresponding to the target audio may be displayed on the search result list.

In addition, for making a search result of the target audio more accurate, when inputting the audio name of the target audio in the search box, the user may further input the name of a player of the target audio. If the target audio is a song, the player of the target audio is the name of the singer.

In step 102, upon detection of an adding-to-playlist instruction for the MV, the MV is added to a playlist and the name of the MV is displayed on the playlist.

In implementation, if the user wants to add the MV to the playlist, the user may click on an operation option corresponding to the name of the MV on the searching list. The mobile terminal will detect a clicking instruction on the operation option and then display options such as a playing next-audio-data option and an adding-to-playlist option. The user may click on the adding-to-playlist option. The mobile terminal will detect a clicking instruction on the adding-to-playlist option, add the MV to the playlist, and display the name of the MV on the playlist.

In addition, the user plays the MV with a playing interface of the music application (which may also be referred to as a playing interface of the MV) and the video picture of the MV is displayed on the playing interface. If the user wants to add the MV to the playlist, the user may click on any position on the playing interface of the MV and the mobile terminal will display the adding-to-playlist option on the playing interface of the MV. Then the user may click on the adding-to-playlist option and the mobile terminal will detect a clicking instruction on the adding-to-playlist option, add the MV to the playlist and display the name of MV on the playlist.

In addition, an adding-to-audio-data-list option may further be disposed on the playing interface of the MV. The user may click on the adding-to-audio-data-list option and then the mobile terminal will detect a clicking instruction on the adding-to-audio-data-list option and add the name of the MV to the audio data list.

In addition, a single tune circulation option may further be disposed on the playing interface of the MV. The user may click on the single tune circulation option and then the mobile terminal will detect a clicking instruction on the single tune circulation option and play the MV repeatedly.

In step 103, according to the playlist, upon detection that the MV is being played, if it is determined that the MV can be played, a first playing mode is executed.

The first playing mode includes a floating window playing mode, a background playing manner, and a music application playing interface playing mode. In the floating window playing mode, the video picture of the MV is displayed on the floating window and the floating window may be located at the uppermost layer of a display interface on a screen of the mobile terminal. In the background playing manner, the video picture of the MV is not displayed on the screen of the mobile terminal. In the music application playing interface playing mode, the video picture of the MV is displayed on the screen as the case where the music application normally plays the MV.

In implementation, when playing audio data, the user chooses to play the audio data following the playlist, and then the mobile terminal plays the audio data on the playlist. Upon detection that the MV is being played, the mobile terminal may detect whether the background playing function or the floating window playing function of the music application is enabled, and determine that the MV can be played when it is detected that any of the background playing function or the floating window playing function is enabled or the interface displayed on the screen of the mobile terminal currently is the interface of the music application, and play the MV in the first playing mode.

Optionally, the first playing mode is the floating window playing manner, and the corresponding processing process is as follows.

Manner I: if it is determined that the MV can be played, the MV is played in the floating window playing manner.

In implementation, the music application has a new function of playing the MV on the floating window. The user may click on a setting option in the music application and then the mobile terminal will detect a clicking instruction on the setting option, and display an MV playing option, an audio playing option, a downloading setting option and other options. Subsequently, the user may click on the MV playing option and then the mobile terminal can detect a clicking instruction on the MV playing option, and display a floating window playing option. Hereafter, the user may click on the floating window playing option, and the mobile terminal will enable the floating window playing function. In this way, the MV of the target audio can be played.

In this way, upon detection that the MV is being played, the mobile terminal may detect that the floating window playing function of the music application is enabled and determine that the MV can be played. Then the mobile terminal plays the MV in the floating window playing mode. In the floating window playing manner, the floating window is displayed at the uppermost layer of all interfaces displayed on the screen currently. The floating window has a size less than that of the screen and may be of any shape, such as a circular shape, an oval shape and a rectangular shape. In this way, the MV can be played like audio.

Optionally, the video picture of the MV may further be displayed on the floating window.

Figure 2:
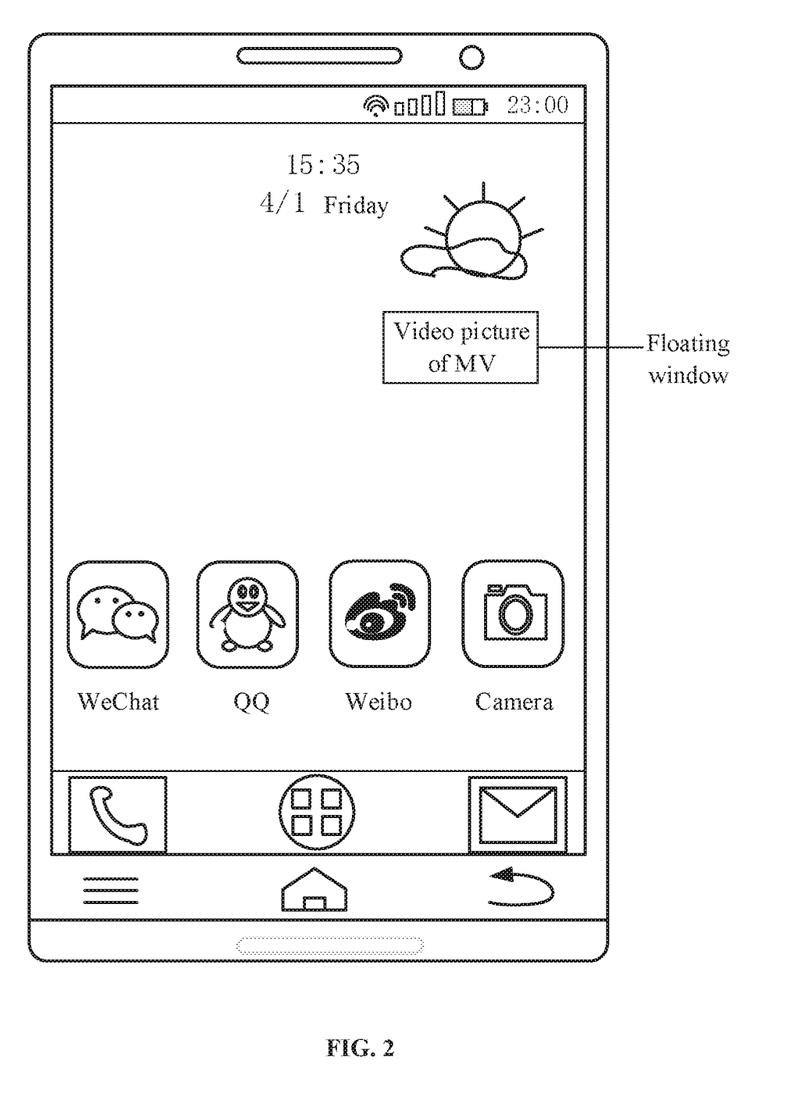
FIG. 2 is a diagram of a floating window according to an embodiment of the present disclosure.

In implementation, in order to enable the user to watch the video picture of the MV, the video picture of the MV may further be displayed on the floating window and the floating window may be displayed at any position of the screen. In this way, the user can watch the video picture of the MV. For example, as illustrated in FIG. 2, after the user controls the mobile phone to display the desktop, the floating window may be displayed on the desktop and at the same time, the video picture of the MV is displayed on the floating window.

In addition, the size of the floating window may be adjusted. The user may put two fingers on the floating window and slide the two fingers in opposite directions. In this way, the floating window zooms in. The user may put two fingers on the floating window and slide the two fingers towards the centre. In this way, the floating window zooms out. In addition, the size of the floating window may further be adjusted in such a manner that dragging buttons are disposed on four sides of the floating window and the user may adjust the size of the floating window by operating and controlling the dragging buttons. For example, the user may press the rightward dragging button and then slide rightwards to zoom in the floating window.

In addition, the user may long press the floating window and drag the floating window to change the position of the floating window.

In addition, if the user wants to return to the playing interface of the MV and continue to watch the video picture of the MV, the user may click on the floating window, and then the mobile terminal will detect the clicking instruction on the floating window and display the playing interface of the MV.

Optionally, a triggering manner for returning to the playing interface of the MV is not limited to clicking, and may further be sliding, double-clicking, long-pressing, and the like.

Manner II: if it is determined that the MV can be played, the MV is played in the background playing mode. In the background playing mode, the video picture of the MV is not displayed on the current screen.

In implementation, the music application has a new function of playing the MV in the background. The user may click on the setting option of the music application and then the mobile terminal will detect the clicking instruction on the setting option, and display the MV playing option, the audio playing option, the downloading setting option and other options. Subsequently, the user may click on the MV playing option and then the mobile terminal will detect a clicking instruction on the MV playing option, and then display a background playing option. Hereafter, the user may click on the background playing option, and the mobile terminal will enable the background playing function. In this way, the MV corresponding to the target audio can be played.

In this way, upon detection that the MV is being played, the mobile terminal may detect that the background playing function of the music application is enabled, determine that the MV can be played, and then play the MV in the background playing manner. In the background playing manner, the mobile terminal may play the MV uninterruptedly, but the video picture of the MV is not displayed on the current screen of the mobile terminal. And at the same time, the mobile terminal may display, on the screen, other interfaces (these interfaces are displayed in a maximized manner, i.e., displayed on the screen). At this time, the user may browse other interfaces. When the user triggers the maximum display of the playing interface of the MV (for example, the user may trigger the screen to display interfaces of a plurality of applications started in the background, and then click on the interface of the music application), the mobile terminal may display, on the screen, the playing interface of the MV, on which the video picture of the MV is displayed. At this time, the playing progress of the MV is the same as that of the MV that has been played in the playing interface. In this way, the MV can be played like audio.

Figure 3:
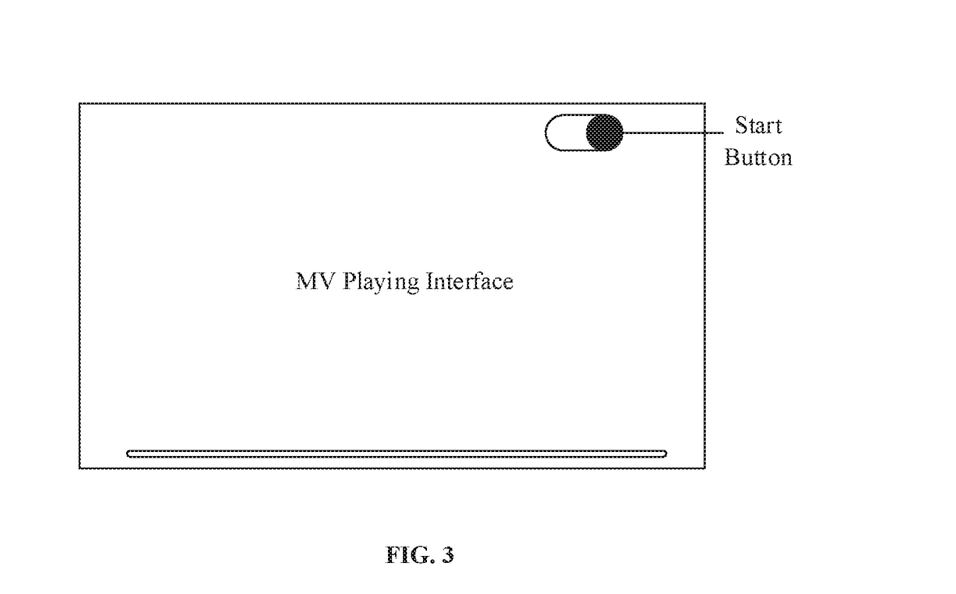
FIG. 3 is a diagram of a starting button according to an embodiment of the present disclosure.

In addition, when the mobile terminal plays the MV corresponding to the target audio with the music application, if the user wants to set the MV to be played in the background or on the floating window, the user may click on any position in the playing interface of the MV, as illustrated in FIG. 3, and then the mobile terminal will display a starting button of the background playing option on the playing interface of the MV. Subsequently, the user may click on the starting button of the background playing option and the mobile terminal will detect a clicking instruction on the starting button and then enable the background playing function. The background playing can be achieved for the iOS system by using the ready-made avplayer, and for the Android system by using the open-source ijkplayer. By taking the iOS system as an example, codes for implementing background playing function may be as follows.

```
NSArray* tracks = self.avPlayerItem.tracks;
for (AVPlayerItemTrack* track in tracks)
{
if ([track.assetTrack.mediaType isEqualToString:AVMediaTypeVideo])
{
```

```
track.enabled = NO;
    }
  }
}
```

For example, when the user watches the video picture of the MV corresponding to the target audio on the playing interface of the MV, if the other instant messaging application receives a message and the user wants to check the message, or if the user wants to listen to the audio while browsing the web, the user may click on an exit button displayed on the playing interface of the MV and then the mobile terminal can detect a clicking instruction on the exit button and determine whether the MV can be played in the background. If it is detected that the MV can be played in the background, the mobile terminal may continue to play the MV without displaying the video picture of the MV. In this way, the MV can be played in the background.

Or when the user watches the video picture of the MV corresponding to the target audio on the playing interface of the MV, if the other instant messaging application receives a message and the user wants to check the message, or if the user wants to listen to the audio while browsing the web, the user may click on an exit button displayed on the playing interface of the MV and then the mobile terminal can detect a clicking instruction on the exit button and determine whether the MV can be played on the floating window. If it is detected that the MV can be played on the floating window, the mobile terminal may continue to play audio data of the MV and display the floating window in which the video picture of the MV is displayed. In this way, the MV can be played on the floating window.

It should be noted that in the above two manners, when the video is played, if it is determined that the background playing function is enabled, the video may be continued to be played in the background while the interface for playing the video is exited. When the video is played, if it is determined that the floating window playing function is enabled, the video can be continued to be played on the floating window while the interface for playing the video is exited.

In step 104, when it is determined that the MV cannot be played, a second playing mode is executed.

The second playing mode may be pre-set by a skilled person and is stored in the mobile terminal. The second playing mode may be playing audio data of a next audio, pause of the audio data, and like.

In implementation, when playing audio data, the user chooses to play the audio data according to the playlist, and the mobile terminal plays the audio data on the playlist. Upon detection that the MV is being played, the mobile terminal may detect whether the background playing function or the floating window playing function of the music application is enabled. If it is detected that none of the background playing function or the floating window playing function is enabled and the interface displayed on the screen of the mobile terminal currently is not a MV playing interface of the music application, the mobile terminal determines that the MV cannot be played and may play in the second playing mode.

Optionally, when the second playing mode is playing audio data of the next audio, the corresponding processing of step 104 may be as follows.

When it is determined that the MV cannot be played, a next audio following the MV is determined on the playlist; and audio data of the next audio is played.

In implementation, when playing audio data, the user chooses to play the audio data according to the playlist, and the mobile terminal plays the audio data on the playlist. Upon detection that the MV is being played, the mobile terminal may detect whether the background playing function or the floating window playing function of the music application is enabled. If it is detected that none of the background playing function or the floating window playing function is enabled and the interface displayed on the screen of the mobile terminal currently is not the MV playing interface of the music application, it is determined that the MV cannot be played. The mobile terminal may determine the next audio following the MV on the playlist and then plays the audio data of the next audio. That is, when the interface for playing the video is exited and the background playing function is not enabled, the next audio following the MV on the playlist can be determined and the next audio is played.

In addition, if the user sets, in the mobile terminal, that a video data cannot be played in the case of mobile data connection, when playing audio data, the user chooses to play audio data according to the playlist and the mobile terminal will play the audio data on the playlist. Upon detection that the MV is being played, the mobile terminal will determine that this MV cannot be played in the background or on the floating window when detecting the mobile data connection, and then may determine the next audio following the MV on the playlist and play audio data of the next audio.

Optionally, if playing in sequence according to the playlist, the next audio is a latter audio adjacent to the MV on the playlist. If playing is performed randomly according to the playlist, the next audio is an audio which is determined according to a random algorithm, following the MV.

In addition, an embodiment of the present disclosure provides a method of playing audio data. An execution flow of this method may be as follows.

In step a, upon receiving a searching instruction for a target audio, a video corresponding to an audio name of the target audio is displayed on a search result list.

The target audio is any audio that a user wants to search for, and this embodiment of the present disclosure is described by taking the audio being a song as an example.

In implementation, when the user wants to listen to the target audio, the user may install a music application on the mobile terminal and then start the music application. The mobile terminal will display a main interface of the music application, in which a search box, an audio data list, an anchor station, a ranking list and other options are displayed. The user may input the audio name of the target audio in the search box, and then click on a corresponding searching button. Subsequently, the mobile terminal will detect a clicking instruction on the searching button, and then send, to a server, a searching request for the target audio, which carries the audio name of the target audio. After receiving the searching request, the server may parse the searching request to obtain the audio name of the target audio, and then search for the target audio according to the audio name of the target audio. If the target audio cannot be found (this is because the copyright of the target audio belongs to other music applications), the server may find whether an MV corresponding to the target audio exists. If the video corresponding to the target audio exists, the server may send, to the mobile terminal, the name of the MV corresponding to the target audio, and an identifier indicating that the search result is an MV.

After receiving the name of MV corresponding to the target audio and the identifier indicating that the search result is the MV, which are sent by the server, the mobile terminal can display the video corresponding to the target audio on the search result list. Here, the name of the video corresponding to the target audio can be displayed on the search result list.

Optionally, when it is determined that an authorization of playing the video corresponding to the target audio exists, the video corresponding to the audio name is displayed on the search result list, and the corresponding processing may be as follows. Upon receiving the searching instruction for the target audio, if it is determined that the authorization of playing the video corresponding to the target audio exists, the name of the video corresponding to the target audio is displayed on the search result list.

This process has been illustrated in the foregoing and will not be elaborated.

In step b, upon detection of the video corresponding to the audio name of the target audio, it is determined whether a background playing function is enabled.

In implementation, upon detection of the video corresponding to the audio name of the target audio, the mobile terminal may detect whether a background playing function of the music application is enabled (the determination process is described in detail in the foregoing).

In step c, when the background playing function is enabled, upon detection that an interface for playing the video is exited, the video is controlled to continue being played in the background, which refers to that a video picture of the video will not be displayed on a current screen.

In implementation, if the user does not want to display the video of the target audio on the playing interface, the user may exit the interface for playing the video. After detecting this, the mobile terminal may control the video to continue being played in the background in the case that the background playing function is enabled.

Optionally, after the video is added to a playlist, when playing is performed using the playlist, it is determined whether a background playing function is enabled. The corresponding processing may be as below.

Upon detection of an adding-to-playlist instruction, the video is added to the playlist and the audio name is displayed on the playlist, wherein the adding-to-playlist instruction is configured to add the video corresponding to the audio name to the playlist; and according to the playlist, upon detection that the video corresponding to the audio name is being played, whether a background playing function is enabled is determined.

This process has been illustrated in the foregoing and will not be repeated.

Optionally, exiting the interface for playing video may be entry of a screen-locked state. The corresponding processing may be as below.

When the smart terminal enters the screen-locked state, the video is controlled to continue to be played in the background.

In implementation, when the mobile terminal plays the video, upon detecting that the mobile terminal enters the screen-locked state, the video may be controlled to continue being played in the background.

In addition, when the background playing function is not enabled, the processing may be as below.

When the background playing function is not enabled, upon detection that an interface for playing the video is exited, a next audio following the video on the playlist is determined. Then, the next audio is played.

This process has been illustrated in the foregoing and will not be elaborated.

In the embodiment of the present disclosure, upon receiving the searching instruction for the target audio, when it is determined that an authorization of playing the MV corresponding to the target audio exists, a name of the MV is displayed on the search result list. Upon detection of an adding-to-playlist instruction for the MV, the MV is added to a playlist and the name of the MV name is displayed on the playlist. According to the playlist, upon detection that the MV is being played, when it is determined that the MV can be played, the first playing mode is executed. When it is determined that the MV cannot be played, the second playing mode is executed. In this way, when the music application installed on the terminal does not have an authorization of playing a certain audio, if the authorization of playing the MV corresponding to the audio exist, the MV corresponding to the audio is played, so that the user can listen to the audio without the need to download a music application having the authorization of playing the audio. Therefore, a lot of time can be saved.

Figure 4:
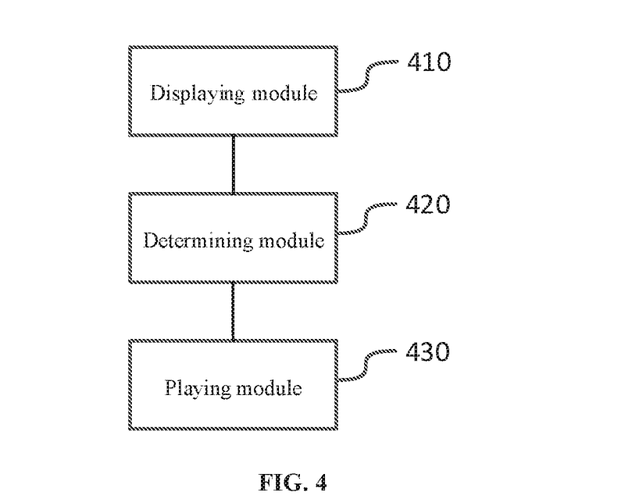
FIG. 4 is a structural diagram of a device of playing audio data according to an embodiment of the present disclosure.

Based on the same technical concept, an embodiment of the present disclosure further provides a device of playing audio data. As illustrated in FIG. 4, the apparatus includes:

a displaying module 410 configured to, upon receiving a searching instruction for a target audio, display a video corresponding to an audio name of a target audio on a search result list;

a determining module 420 configured to, upon detection that the video corresponding to the audio name is being played, determine whether a background playing function is enabled, and a playing module 430 configured to, when the background playing function is enabled, upon detection that an interface for playing the video is exited, control the video to continue being played in the background, which refers to that a video picture of the video will not be displayed on a current screen.

Optionally, the playing module 430 is configured to:

when the smart terminal enters a screen-locked state, control the video to continue being played in the background.

Optionally, the displaying module 410 is configured to:

upon receiving the searching instruction for the target audio, when it is determined that a authorization of playing the video corresponding to the target audio exists, display the video corresponding to the audio name of the target audio on the search result list.

Optionally, the playing module 430 is configured to:

upon detection of an adding-to-playlist instruction, add the video to a playlist and display the audio name on the playlist, wherein the adding-to-playlist instruction is configured to add the video corresponding to the audio name to the playlist; and according to the playlist, upon detection that the video corresponding to the audio name is being played, determine whether a background playing function is enabled.

Optionally, the playing module 430 is further configured to:

determine a next audio following the video on the playlist upon detection that an interface for playing the video is exit when the background playing function is not enabled; and play the next audio.

In the embodiment of the present disclosure, upon receiving the searching instruction for the target audio, if it is determined that an authorization of playing the MV corresponding to the target audio exists, the MV is displayed on the search result list. Upon detection of an adding-to-playlist instruction for the MV, the MV is added to a playlist and the MV name is displayed on the playlist. According to the playlist, upon detection that the MV is being played, if it is determined that the MV can be played, the first playing mode is executed. If it is determined that the MV cannot be played, the second playing mode is executed. In this way, when the music application installed on the terminal does not have an authorization of playing a certain audio, if the authorization of playing the MV corresponding to the audio exist, the MV corresponding to the audio is played, so that the user can listen to the audio without the need to download a music application having the authorization of playing the audio. Therefore, a lot of time can be saved.

It should be noted that the apparatus of playing video data provided by the present embodiment is described only by taking division of all the functional modules as an example for explanation when playing audio data. In practice, the above functions can be completed by the different functional modules as required. That is, the internal structure of the device is divided into different functional modules to complete all or part of the functions described above. In addition, the device of playing video data provided by the present embodiment has the same concept as the method of playing video data according to the foregoing embodiment. Refer to the method embodiment for the specific implementation process of the method, which will not be elaborated herein.

Figure 5:
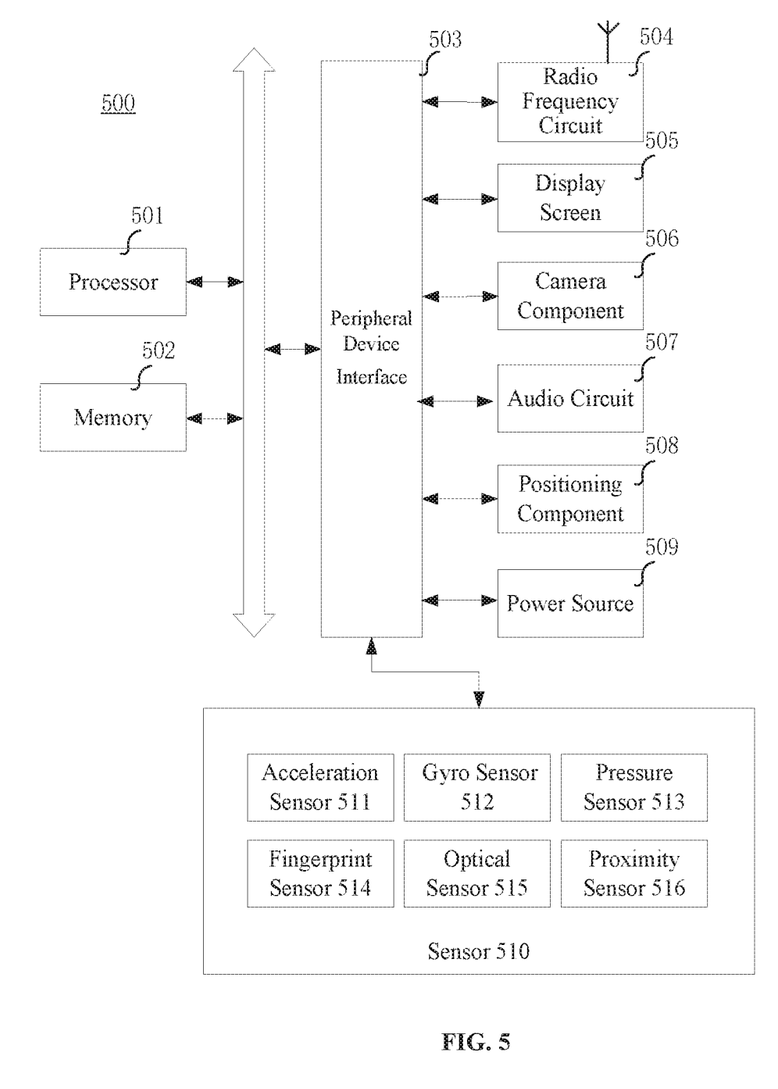
FIG. 5 is a structural diagram of a terminal according to an embodiment of the present disclosure.

FIG. 5 is a structural block diagram of a terminal 500 according to an embodiment of the present disclosure. The terminal 500 may be a smart phone, a tablet computer, an MP3 (Moving Picture Experts Group Audio Layer III) player, an MP4 (Moving Picture Experts Group Audio Layer IV) player, a laptop or desk computer. The terminal 500 may further be called a UE (User Equipment), a portable terminal, a laptop terminal, a desk terminal, etc.

Typically, the terminal 500 includes a processor 501 and a memory 502.

The processor 501 may include one or more processing cores, such as a 4-core processor and an 8-core processor. The processor 501 may be formed in a manner of hardware, the hardware comprising at least one of a DSP (Digital Signal Processing), an FPGA (Field-Programmable Gate Array), and a PLA (Programmable Logic Array). The processor 501 may further include a main processor and a coprocessor. The main processor is a processor for processing data in an awake state, and is further called a CPU (Central Processing Unit). The coprocessor is a low-power-consumption processor for processing data in a standby state. In some embodiments, the processor 501 may be integrated with a GPU (Graphics Processing Unit), which is configured to render and draw the content that needs to be displayed by a display screen. In some embodiments, the processor 501 may further include an AI (Artificial Intelligence) processor configured to process computing operations related to machine learning.

The memory 502 may include one or more computer-readable storage mediums, which can be non-transitory. The memory 502 may further include a high-speed random access memory, as well as a non-volatile memory, such as one or more disk storage devices and flash storage devices. In some embodiments, the non-transitory computer-readable storage medium in the memory 502 is configured to store at least one instruction. The at least one instruction is configured to be executed by the processor 501 to implement the method of playing audio data according to the embodiments of the present disclosure.

In some embodiments, the terminal 500 further optionally includes a peripheral device interface 503 and at least one peripheral device. The processor 501, the memory 502, and the peripheral device interface 503 may be connected through a bus or a signal line. Each peripheral device may be connected to the peripheral device interface 503 through a bus, a signal line or a circuit board. For example, the peripheral device includes at least one of a radio frequency circuit 504, a touch display screen 505, a camera 506, an audio circuit 507, a positioning component 508 and a power source 509.

The peripheral device interface 503 may be configured to connect at least one peripheral device associated with an I/O (Input/Output) to the processor 501 and the memory 502. In some embodiments, the processor 501, the memory 502 and the peripheral device interface 503 are integrated on the same chip or circuit board. In some other embodiments, any one or two of the processor 501, the memory 502 and the peripheral device interface 503 may be implemented on a separate chip or circuit board, which is not limited in the present embodiment.

The radio frequency circuit 504 is configured to receive and transmit an RF (Radio Frequency) signal, which is further referred to as an electromagnetic signal. The radio frequency circuit 504 communicates with a communication network and other communication devices via the electromagnetic signal. The radio frequency circuit 504 converts electrical signals into electromagnetic signals for transmission, or converts received electromagnetic signals into electrical signals. Optionally, the radio frequency circuit 504 includes an antenna system, an RF transceiver, one or more amplifiers, a tuner, an oscillator, a digital signal processor, a codec chipset, a subscriber identity module card (SIM card), and the like. The radio frequency circuit 504 can communicate with other terminals under at least one wireless communication protocol. The wireless communication protocol includes, but not limited to, the World Wide Web, a metropolitan area network, an intranet, various generations of mobile communication networks (2G, 3G, 4G, and 5G), a wireless local area network, and/or a WiFi (Wireless Fidelity) network. In some embodiments, the RF circuit 504 may further include NFC (Near Field Communication) related circuits, which is not limited in the present disclosure.

The display screen 505 is configured to display a UI (User Interface). The UI may include graphics, text, icons, videos, and any combination thereof. When the display screen 505 is a touch display screen, the display screen 505 further has the capacity to acquire touch signals on or over the surface of the display screen 505. The touch signal may be input into the processor 501 as a control signal for processing. At this time, the display screen 505 may further be configured to provide virtual buttons and/or virtual keyboards, which are further referred to as soft buttons and/or soft keyboards. In some embodiments, one display screen 505 may be disposed on the front panel of the terminal 500. In some other embodiments, at least two display screens 505 may be disposed respectively on different surfaces of the terminal 500 or in a folded design. In further embodiments, the display screen 505 may be a flexible display screen disposed on the curved or folded surface of the terminal 500. Even the display screen 505 may have an irregular shape other than a rectangle; that is, the display screen 505 may be an irregular-shaped screen. The display screen 505 may be an LCD (liquid Crystal Display) screen, an OLED (Organic Light-Emitting Diode) screen or the like.

The camera component 506 is configured to capture images or videos. Optionally, the camera component 506 includes a front camera and a rear camera. Usually, the front camera is placed on the front panel of the terminal, and the rear camera is placed on the back of the terminal. In some embodiments, at least two rear cameras are disposed, and are one of a main camera, a depth-of-field camera, a wide-angle camera, and a telephoto camera respectively, so as to realize a background blurring function achieved by fusion of the main camera and the depth-of-field camera, panoramic shooting and VR (Virtual Reality) shooting functions achieved by fusion of the main camera and the wide-angle camera or other fusion shooting functions. In some embodiments, the camera component 506 may further include a flashlight. The flashlight may be a mono-color temperature flashlight or a two-color temperature flashlight. The two-color temperature flash is a combination of a warm flashlight and a cold flashlight and can be used for light compensation at different color temperatures.

The audio circuit 507 may include a microphone and a speaker. The microphone is configured to collect sound waves of users and the environments, and convert the sound waves into electrical signals which are input into the processor 501 for processing, or input into the RF circuit 504 for voice communication. For the purpose of stereo acquisition or noise reduction, there may be a plurality of microphones respectively disposed at different locations of the terminal 500. The microphone may further be an array microphone or an omnidirectional acquisition microphone. The speaker is then configured to convert the electrical signals from the processor 501 or the radio frequency circuit 504 into the sound waves. The speaker may be a conventional film speaker or a piezoelectric ceramic speaker. When the speaker is the piezoelectric ceramic speaker, the electrical signal can be converted into not only human-audible sound waves but further the sound waves which are inaudible to humans for the purpose of ranging and the like. In some embodiments, the audio circuit 507 may further include a headphone jack.

The positioning component 508 is configured to locate the current geographic location of the terminal 500 to implement navigation or LBS (Location Based Service). The positioning component 508 may be a positioning component based on the American GPS (Global Positioning System), the Chinese Beidou system, the Russian Galileo system.

The power source 509 is configured to supply power to various components of the terminal 500. The power source 509 may be alternating current, direct current, a disposable battery, or a rechargeable battery. When the power source 509 includes the rechargeable battery, the rechargeable battery may a wired rechargeable battery or a wireless rechargeable battery. The wired rechargeable battery is a battery charged by a cable, and wireless rechargeable battery is charged by a wireless coil. The rechargeable battery may further support the fast charging technology.

In some embodiments, terminal 500 further includes one or more sensors 510. The one or more sensors 510 include, but not limited to, an acceleration sensor 511, a gyro sensor 512, a pressure sensor 513, a fingerprint sensor 514, an optical sensor 515 and a proximity sensor 516.

The acceleration sensor 511 may detect magnitudes of accelerations on three coordinate axes of a coordinate system established by the terminal 500. For example, the acceleration sensor 511 may be configured to detect components of a gravitational acceleration on the three coordinate axes. The processor 501 may control the touch display screen 505 to display a user interface in a landscape view or a portrait view according to a gravity acceleration signal collected by the acceleration sensor 511. The acceleration sensor 511 may further be configured to collect motion data of a game or a user.

The gyro sensor 512 can detect an azimuth and a rotation angle of the terminal 500, and can cooperate with the acceleration sensor 511 to collect a 3D motion of the user on the terminal 500. Based on data collected by the gyro sensor 512, the processor 501 can serve the following functions: motion sensing (such as changing the UI according to a user's tilting operation), image stabilization during shooting, game control and inertial navigation.

The pressure sensor 513 may be disposed on a side frame of the terminal 500 and/or an underneath layer of the touch display screen 505. When the pressure sensor 513 is disposed on the side frame of the terminal 500, a signal of holding on the terminal 500 by a user can be detected. The processor 501 can perform left-right hand recognition or quick operation according to the single of holding collected by the pressure sensor 513. When the pressure sensor 513 is disposed on the underneath layer of the touch display screen 505, the processor 501 controls an operable control on the UI according to a user's pressure operation on the touch display screen 505. The operable control includes at least one of a button control, a scroll bar control, an icon control and a menu control.

The fingerprint sensor 514 is configured to collect a user's fingerprint. The processor 501 identifies the user's identity based on the fingerprint collected by the fingerprint sensor 514, or the fingerprint sensor 514 identifies the user's identity based on the collected fingerprint. When the user's identity is identified as trusted, the processor 501 authorizes the user to perform related sensitive operations, such as unlocking the screen, checking encrypted information, downloading software, paying, and changing settings. The fingerprint sensor 514 may be provided on the front side, the back side, or the lateral side of the terminal 500. When the terminal 500 is provided with a physical button or a manufacturer's Logo, the fingerprint sensor 514 may be integrated with the physical button or the manufacturer's Logo.

The optical sensor 515 is configured to acquire ambient light intensity. In one embodiment, the processor 501 may control the display brightness of the touch display screen 505 according to the ambient light intensity acquired by the optical sensor 515. For example, when the ambient light intensity is high, the display brightness of the touch display screen 505 is increased; and when the ambient light intensity is low, the display brightness of the touch display screen 505 is decreased. In another embodiment, the processor 501 may further dynamically adjust shooting parameters of the camera component 506 according to the ambient light intensity acquired by the optical sensor 515.

The proximity sensor 516, further referred to as a distance sensor, is usually disposed on the front panel of the terminal 500. The proximity sensor 516 is configured to capture a distance between the user and a front surface of the terminal 500. In one embodiment, when the proximity sensor 516 detects that the distance between the user and the front surface of the terminal 500 becomes gradually smaller, the processor 501 controls the touch display screen 505 to switch from a screen-on state to a screen-off state. When it is detected that the distance between the user and the front surface of the terminal 500 gradually increases, the processor 501 controls the touch display screen 505 to switch from the screen-off state to the screen-on state.

It will be understood by those skilled in the art that the structure illustrated in FIG. 5 does not constitute a limitation to the terminal 500, and may include more or less components than those illustrated, or combine some components or adopt different component arrangements.

Persons of ordinary skill in the art can understand that all or part of the steps described in the above embodiments can be completed through hardware, or through relevant hardware instructed by applications stored in a non-transitory computer readable storage medium, such as a read-only memory, a disk or a CD, etc.

The foregoing descriptions are merely exemplary embodiments of the present disclosure, and are not intended to limit the present disclosure. Within the spirit and principles of the disclosure, any modifications, equivalent substitutions, improvements, etc., are within the protection scope of the present disclosure.

The invention claimed is:

1. A method of playing audio data, applied to a smart terminal, comprising:
   upon receiving a searching instruction of a target audio, sending a searching request for the target audio to a server, the searching request carries an audio name of the target audio;
   receiving a video name corresponding to the audio name of the target audio and an identifier of a search result sent by the server when the target audio cannot be found and a video corresponding to the audio name of the target audio is found, wherein the identifier indicates that the search result is a video;
   upon receiving the video name and the identifier, determining there is no authorization for playing the target audio and there is an authorization for playing the video, and displaying the video corresponding to the audio name of the target audio on a search result list;
   upon detecting that the video is being played, determining whether a background playing function is enabled; and
   when the background playing function is enabled, upon detecting that an interface of playing the video is exited, making the video to continue being played in the background, wherein a video picture of the video is not displayed on a current screen;
   when the background playing function is not enabled, upon detecting that an interface for playing the video is exited, executing a second playing manner, the second playing manner is playback of audio data of a next audio, or suspension of playback of the audio data;
   and upon detecting that any position in the video playing interface is clicked, displaying a starting button of a background playback option in the video playing interface, wherein the starting button of the background playback option is configured to enable the background playing function.

2. The method of claim 1, wherein upon detecting that the interface of playing the video is exited, making the video to continue being played in the background comprises:
   when the smart terminal enters a screen-locked state, making the video to continue being played in the background.

3. The method of claim 1, wherein upon receiving the searching instruction of the target audio, displaying the video corresponding to the audio name of the target audio on the search result list comprises:
   upon receiving the searching instruction of the target audio, when it is determined that an authorization of playing the video corresponding to the target audio exists, displaying the video corresponding to the audio name of the target audio on the search result list.

4. The method of claim 3, wherein upon detecting that the video corresponding to the audio name is being played, determining whether the background playing function is enabled comprises:
   upon detecting of an adding-to-playlist instruction, adding the video to a playlist and displaying the audio name on the playlist, wherein the adding-to-playlist instruction is configured to add the video corresponding to the audio name to the playlist; and
   according to the playlist, upon detecting that the video corresponding to the audio name is being played, determining whether the background playing function is enabled.

5. The method of claim 4, further comprising:
   when the background playing function is not enabled, upon detecting that the interface of playing the video is exited, determining Rallthe next audio following the video on the playlist; and
   playing the next audio.

6. An apparatus of playing audio data, comprising a processor and a memory, wherein
   the memory is configured to store at least one instruction, wherein the at least one instruction can be loaded and executed by the processor;
   the processor is configured to:
   upon receiving a searching instruction f a target audio, sending searching request for the target audio to a server;
   receiving a video name corresponding to an audio name of the target audio and an identifier of a search result sent by the server when the target audio cannot be found, and a video corresponding to the audio name of the target audio is found, wherein the identifier indicates that the search result is a video and the searching request carries the audio name of the target audio;
   upon receiving the video name and the identifier, determining there is no authorization for playing the target audio and there is an authorization for playing the video, and displaying the video corresponding to the audio name of the target audio on a search result list;
   upon detecting that the video is being played, determine whether a background playing function is enabled; and
   when the background playing function is enabled, upon detection that an interface of playing the video is exited, making the video to continue being played in the background, wherein a video picture of the video is not displayed on a current screen;
   when the background playing function is not enabled, upon detecting that, an interface for playing the video is exited, executing a second playing manner, the second playing manner is playback of audio data of a next audio, or suspension of playback of the audio data;
   and upon detecting that any position in the video playing interface is clicked, displaying a starting button of a background playback option in the video playing interface, wherein the starting button of the background playback option is configured to enable the background playing function.

7. The apparatus of playing audio data according to claim 6, wherein the processor is configured to make the video to continue being played in the background when a smart terminal enters a screen-locked state.

8. The apparatus of playing audio data according to claim 6, wherein when the processor is configured to display the video corresponding to the audio name of the target audio on the search result list, the processor is configured to:

upon receiving the searching instruction of the target audio, when it is determined that an authorization of playing the video corresponding to the target audio exists, display the video corresponding to the audio name of the target audio on the search result list.

9. The apparatus of playing audio data according to claim 6, wherein when the processor is configured to determine whether the background playing function is enabled, the processor is configured to:
upon detecting of an adding-to-playlist instruction, add the video to a playlist and displaying the audio name on the playlist, wherein the adding-to-playlist instruction is configured to acid the video corresponding to the audio name to the playlist; and
according to the playlist, upon detecting that, the video corresponding to the audio name is being played, determine whether the background playing function is enabled.

10. The apparatus of playing audio data according to claim 6, wherein the processor is configured to:
when the background playing function is not enabled, upon detecting that the interface of playing the video is exited, determine the next audio following the video on the playlist; and
play the next audio.

11. A non-transitory computer-readable storage medium storing at least one instruction, when the at least one instruction is loaded and executed by a processor, the processor is configured to:
upon receiving a searching instruction of a target audio, send a searching request for the target audio to a server;
receive a video name corresponding to an audio name of the target audio and an identifier of a search result sent by the server when the target audio cannot be found, and a video corresponding to an audio name of the target audio is found, wherein the identifier indicates that the search result is a video and the searching request carries the audio name of the target audio;
upon receiving the video name and the identifier, determine there is no authorization for playing the target audio and there is an authorization for playing the video, and display the video corresponding to the audio name of the target audio on a search result list;
upon detecting that the video is being played, determine whether a background playing function is enabled; and
when the background playing function is enabled, upon detecting that an interface of playing the video is exited, make the video to continue being played in the background, wherein a video picture of the video is not displayed on a current screen;
when the background playing function is not enabled, upon detecting that an interface for playing the video is exited, execute a second playing manner, the second playing manner is playback of audio data of a next audio, or suspension of playback of the audio data;
and upon detecting that any position in the video playing interface is clicked display a starting button of a background playback option in the video playing interface, wherein the starting button of the background playback option is configured to enable the background playing function.

12. The computer-readable storage medium according to claim 11, wherein when the processor is configured to make the video to continue being played in the background, the processor is configured to make the video to continue being played in the background when a smart terminal enters a screen-locked state.

13. The computer-readable storage medium according to claim 11, wherein when the processor is configured to display the video corresponding to the audio name of the target audio on the search result list, the processor is configured to:
upon receiving the searching instruction of the target audio, when it is determined that an authorization of playing the video corresponding to the target audio exists, display the video corresponding to the audio name of the target audio on the search result, list.

14. The computer-readable storage medium according to claim 11, wherein when the processor is configured to determine whether the background playing function is enabled, the processor is configured to:
upon detecting of an adding-to-playlist instruction, add the video to a playlist and displaying the audio name on the playlist, wherein the adding-to-playlist instruction is configured to add the video corresponding to the audio name to the playlist; and
according to the playlist, upon detecting that the video corresponding to the audio name is being played, determine whether the background playing function is enabled.

15. The computer-readable storage medium according to claim 11, wherein the processor is configured to:
when the background playing function is not enabled, upon detecting that the interface of playing the video is exited, determine the next audio following the video on the playlist; and
play the next audio.

* * * * *